Nov. 27, 1928.

P. PICK

CONTAINER

Filed March 16, 1925   2 Sheets-Sheet 1

1,693,251

Inventor
Paul Pick

Nov. 27, 1928. 1,693,251
P. PICK
CONTAINER
Filed March 16, 1925   2 Sheets-Sheet 2
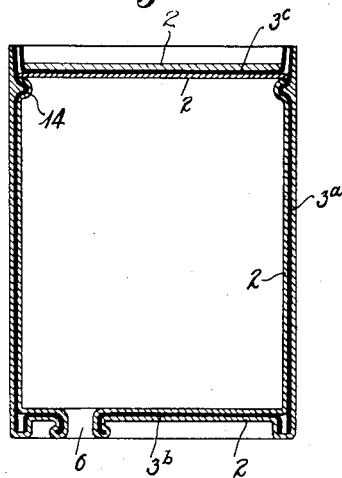
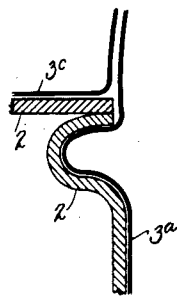
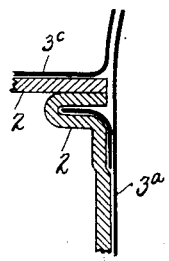
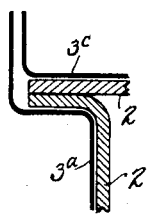
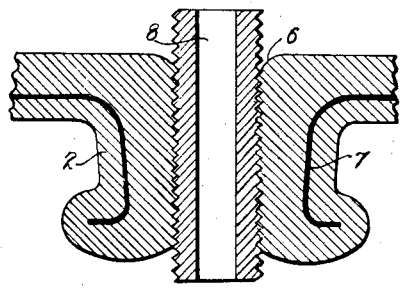
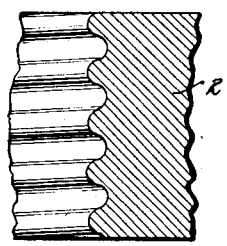
Inventor
Paul Pick
By
Attorneys Patented Nov. 27, 1928.

1,693,251

UNITED STATES PATENT OFFICE.

PAUL PICK, OF NEW YORK, N. Y., ASSIGNOR TO THE KALBFLEISCH CORPORATION OF NEW YORK, OF NEW YORK, N. Y., A CORPORATION OF NEW YORK.

CONTAINER.

Application filed March 16, 1925, Serial No. 16,069, and in Germany March 17, 1924.

My invention relates to containers, such as those which may be constructed of hard rubber, synthetic resin, gutta-percha, celluloid, clay, or other plastic substance which can be transformed by heat or other medium into a stiff and hard, but tough and elastic non-plastic condition.

Closed containers made of the substances referred to are known but have always been constructed of two or more parts. Containers for certain numerous purposes can not be made strong enough to resist the various kinds of strains to which they are subjected if made of a plurality of parts, except, in some cases, by making the walls excessively thick and consequently bulky and heavy. Moreover, it is impossible to properly reinforce containers made up of a plurality of parts; and the seams between the parts are always liable to leakage, particularly where there is internal pressure.

With the above-mentioned and other defects in view, it is the object of my invention to provide a closed container composed of an integral or continuous mass of hardened plastic material, and having a closed in reinforcing structure designed to resist strains of every kind.

It is a further object to provide a container having a maximum strength but with a minimum thickness of wall, whereby economy of space and weight is realized.

A still further object is to provide a container having high resistance to acids and other destructive chemicals and substances. Other objects and advantages achieved by my invention will be made apparent in the following description.

An essential and fundamental feature of the invention consists in that a pressure-proof and strain-resisting closed cage or skeleton frame is embedded within the walls of the container. By giving to the cage sufficient strength to meet all conditions of strain I am enabled to form the container by lining the skeleton, inside and outside, with very thin coats of plastic material. In laying on the coats of plastic material care is taken to completely cover the inner and outer surfaces of the skeleton and to avoid perforations in the coats between the ribs of the skeleton. It is also desirable to maintain uniform thickness and homogenity of the walls in order to obtain the best results in the subsequent operations of hardening, vulcanization or the like.

Each successive step or phase of manufacture must be carried out according to a strict procedure which constitutes my improved method.

Figure 1:
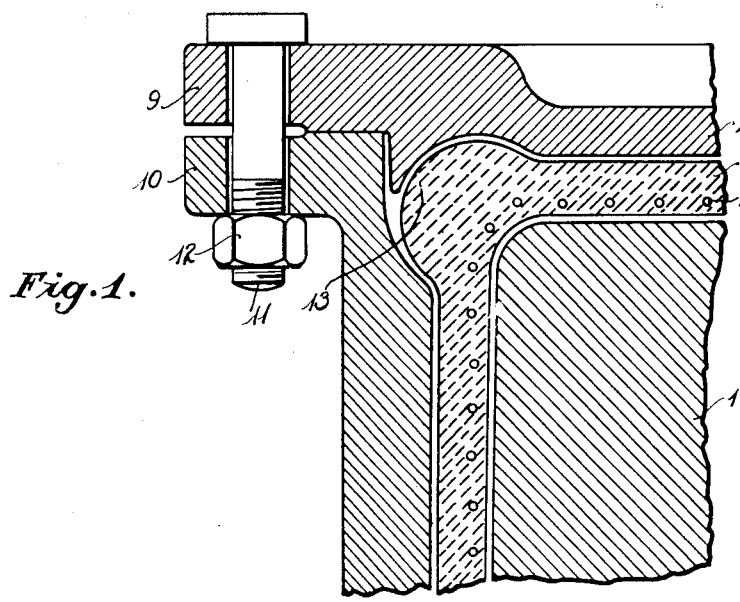
Figure 2:
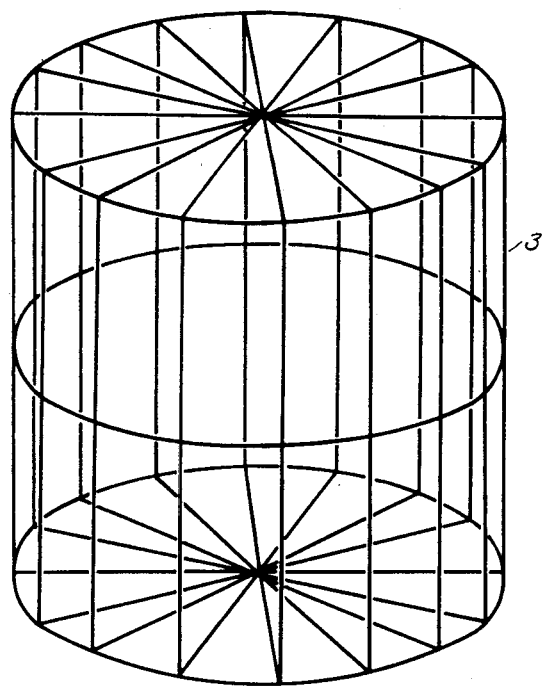

Referring to the accompanying drawings, Fig. 1 is a radial section through one corner of a container, illustrating one manner of forming the walls by means of a core; Fig. 2 is a perspective view of one example of reinforcing cage or skeleton; Fig. 3 is an axial section of a container formed without the use of a core; Figs. 4, 5 and 6 are enlarged fragmentary views, illustrating several shapes of skeleton elements and corresponding modes of laying on the plastic coatings; Fig. 7 is a sectional view of a bung hole; Fig. 8 is an enlarged sectional detail of a special screw for bung holes.

In Figure 3 of the drawings, is illustrated an embodiment of my invention according to which a cylindrical container may be formed with one or both ends open, the cylindrical wall of said container being provided interiorly adjacent either or both ends thereof, with an inwardly-presented shoulder or shoulders for locating suitable end plates or closures for completely closing the container. For this purpose, the plastic material is applied to the walls of the cylindrical container as well as to the plates or closures before the latter are pressed inwardly against the shoulders formed on the inner cylindrical wall of said container. In this way, a seamless joint may be formed by merging the contiguous portions of the tacky plastic material under pressure due to forcing the plates inwardly against said shoulders before the plastic material has been hardened. It is thus an important feature, to provide an abutment at either or each end to oppose the insertion of one or both of the end plates after these parts have been covered with plastic material.

Referring to Figure 3, the reenforcing body is shown as comprising a cylindrical member 3ª, an integrally formed bottom-end member 3ᵇ and a top or closure member 3ᶜ. The inner and outer walls of cylinder 3ª and end members 3ᵇ and 3ᶜ are dressed with inner and outer layers 2, 2, of plastic material. The top member 3ᶜ is then inserted in the upper end of cylinder 3ª until it abuts against a shoulder 14 formed on the inner wall of said cylinder. Other forms of abutments are shown in Figs. 4, 5, and 6 and any other suitable method of assembling the parts may be employed. In this way, all joints between the parts are formed by the contacting of tacky materials and, when united by pressure, a seamless, continuous wall is the result. For greater structural strength, the members of the reinforcing skeleton may then be united by soldering, riveting, folding, etc. The containers thus constructed, may be finished by any suitable hardening process such, for example, as vulcanization after which they may be tested for strength and tightness by means of air or water under pressure. By an inspection of Figures 3, 4, 5, and 6, it will be seen that the container is reenforced at the corners by superposed metallic flanges of the cylinder 3ª and outwardly-presented cylindrical flanges of end plates 3ᵇ and 3ᶜ. The corners are further enlarged and reenforced by superposed portions of the inner shell of hardened plastic material as well as by the overlapping portions of the outer shell of hardened plastic material.

The openings in the finished container, as for example, 6 in Fig. 7, may be closed by a special screw, of chemically inert material when necessary. The screw is formed by inserting a metal nipple 8 in the necked opening 7 and pressing plastic material into the annular space around the nipple. If the threads are lubricated with soap, graphite or other lubricant the nipple may be easily withdrawn.

I have found by experiment that a rounded thread, such as is shown in Fig. 8, is very effective for molded screws for this purpose. A thread of this configuration will be stronger than the usual threads for screws made of relatively weak plastic materials.

Containers built according to my invention may be changed in their shapes and constructive details.

If, for example, such containers have to resist only external pressure their bungholes may be largely increased or a single large opening made, which can be closed by a tight fitting cover. Indeed, this opening may be even larger, and in some cases the whole upper head may be made removable and inserted in the container as a cover.

In the present application, I do not claim the specific features of my invention shown in Figure 1 as the specific features of this embodiment of my invention will be shown, described, and claimed in a separate application.

I claim:—

1. A closed container comprising a closed-in metallic frame provided with an outwardly-presented neck and an inner lining of acid-proof hardened plastic material, that portion of the lining within said neck forming an orifice through the wall of the container.

2. A closed container comprising a metallic frame completely closed in and having inner and outer coverings of hardened plastic material applied thereto and to each other, said frame having an orifice portion presented outwardly through the wall of the container, the metal in the orifice portion of said frame being protected by merged portions of said inner and outer coverings, the inner covering having a wave-like thread moulded therein which does not penetrate to the metal.

3. A closed container comprising side and end walls covered interiorly with protective plastic material, one of said end walls being joined to said side wall by contiguously disposed portions of the plastic material united under pressure to form a seamless joint between said end wall and side wall prior to the hardening of the plastic material.

4. A closed container comprising side walls with interior shoulders and ends fitted into the sides and against the shoulders, the walls and ends being composed of metallic skeletons covered on the inside with protective hardened originally plastic material, the plastic covering of the walls and ends uniting to protect the metal from attack.

5. A closed container comprising side walls and end walls, one of the said walls having a flange abutting against the other wall, the walls and the flange being covered on their inside surfaces and on their abutting surfaces with hardened originally plastic acid-proof material united together at the joining surfaces, so as to form a protection against corrosion of any liquid placed in the container.

6. A closed container comprising side walls and end walls of skeletonized metal, the side walls having interior radial flanges and the end walls cylindrical flanges; both side and end walls being lined with hardened originally plastic acid-proof material, the face of the end walls resting against the flange of the side walls and the flange of the end walls resting against the side of the side walls, the walls and flanges being united together by the said plastic material.

PAUL PICK.